Sept. 15, 1931.   B. E. JOHNSON   1,823,545
TIRE CASING SPREADER
Filed May 9, 1930
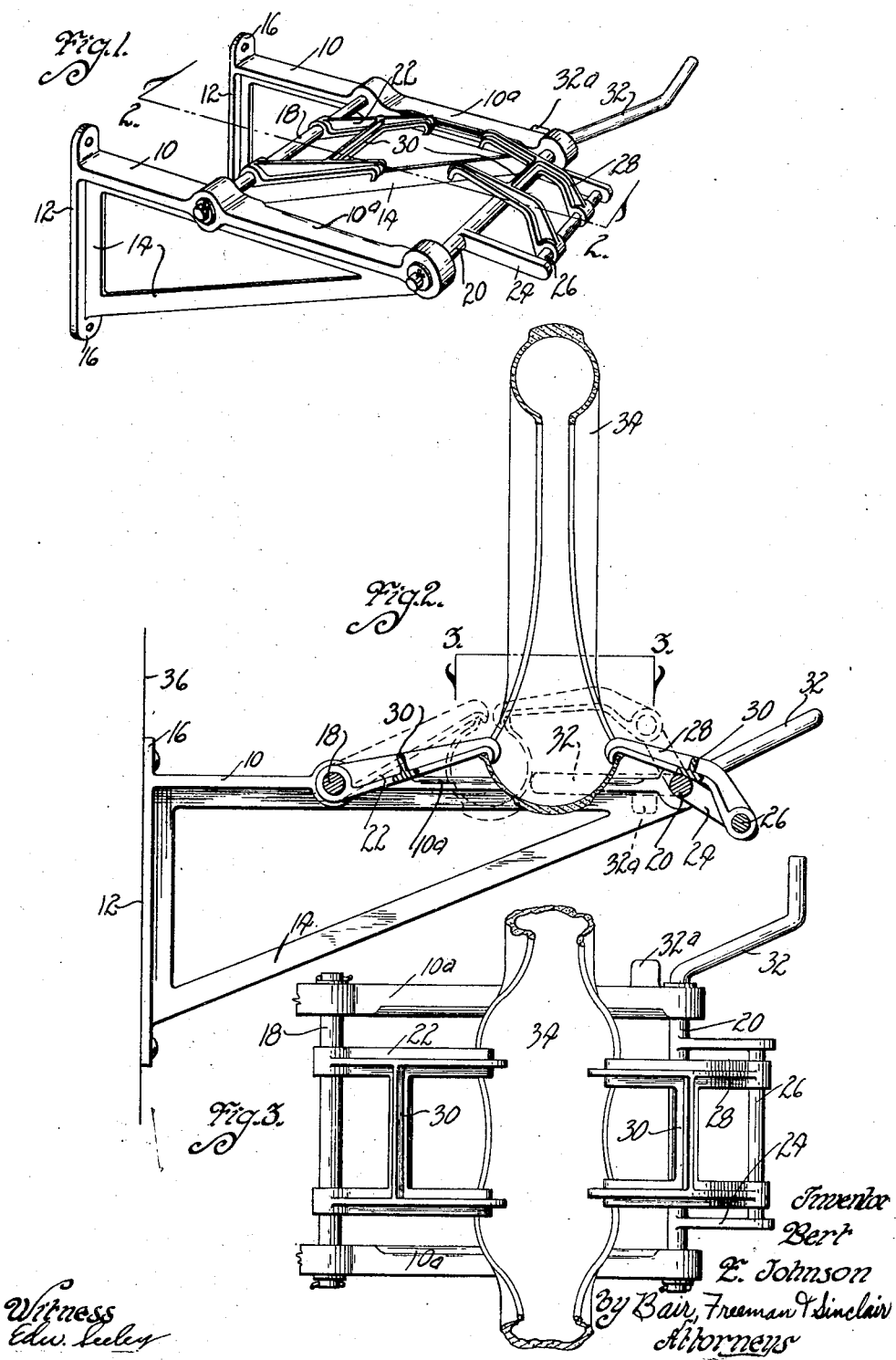

Patented Sept. 15, 1931

1,823,545

UNITED STATES PATENT OFFICE

BERT E. JOHNSON, OF DES MOINES, IOWA, ASSIGNOR OF TWELVE AND ONE-HALF PER CENT TO DON L. CLEVELAND, TWELVE AND ONE-HALF PER CENT TO LESLIE L. HUESTON, AND TWELVE AND ONE-HALF PER CENT TO ROY L. SWARZMAN, ALL OF DES MOINES, IOWA

TIRE CASING SPREADER

Application filed May 9, 1930. Serial No. 451,071.

The object of my invention is to provide a tire casing spreader of simple, durable and comparatively inexpensive construction.

A further object of my invention is to provide a tire casing spreader especially adapted for use in garages and consisting of a pair of supporting arms adapted to be secured in a horizontal position to a garage wall or other supporting surface, and adapted to support a tire casing in a transverse position on the supporting arms, bead hooks being provided for engaging the beads of the tire casing and spreading the casing either for inspection purposes or for repairing the same.

A further object is to provide a tire casing spreader consisting of a pair of supporting arms, a pair of bead hooks pivotally connected thereto, a spreading shaft journaled on the arms and carrying a crank pin, and a second pair of bead hooks pivoted to the crank pin, an operating handle crank being provided for rotating the spreading shaft and thereby spreading a tire casing.

Still a further object is to provide the second pair of bead hooks curved in such a way that when the tire casing is spread, these hooks engage the spreading shaft and their hook ends and the crank pin with relation to the axis of the spreading shaft are held in an over center position for retaining the beads of the tire spreader in position for holding the tire casing spread.

With these and other objects in view my invention consists in the construction, arrangement and combination of the various parts of my device, whereby the objects contemplated are attained, as hereinafter more fully set forth, pointed out in my claims and illustrated in the accompanying drawings. Although the invention is susceptible of a variety of embodiments it is unnecessary to fully describe and illustrate more than one in order to give a full understanding of the invention both from its structural and functional standpoints. Accordingly, I have illustrated a preferred and desirable embodiment of the invention in the accompanying drawings in which:—

Figure 1 is a perspective view of my improved type of tire casing spreader.

Figure 2 is a central, sectional view on the line 2—2 of Figure 1, showing a tire casing spread by the tire casing spreader, and in dotted lines showing the start of the spreading operation; and Figure 3 is a plan view of the device, showing the tire casing in section, as taken on the line 3—3 of Figure 2.

On the accompanying drawings, I have used the reference numeral 10 to indicate a supporting arm.

Two of the arms 10 are provided and each has a base member 12 formed substantially at right angles to the arm. Reinforcing webs 14 are provided to prevent bending of the supporting arms 10 relative to the base members 12.

The ends of the base members 12 are perforated as indicated at 16 for receiving screws or bolts, whereby the arms 10 may be supported relative to a vertical wall. A shaft 18 extends between the arms 10 and is carried thereby. A spreading shaft 20 is journaled in the outer ends of the supporting arms 10.

Bead hooks 22 are carried by the shaft 18. The bead hooks 22 may be secured to the shaft and the shaft may be rotatable relative to the supporting arms 10, or the shaft may be secured to the supporting arms and the bead hooks 22 pivoted thereon if desired, whereby the bead hooks 22 are pivotally supported by the supporting arms 10.

Crank arms 24 extend from the spreading shaft 20 and are connected by a crank pin 26. A second pair of bead hooks 28 is pivoted on the crank pin 26. The pairs of bead hooks 22 and 28 are preferably provided with cross members 30 to prevent twisting of the bead hooks.

An operating handle crank 32 is secured to the spreading shaft 20 or may be formed thereon as desired.

Practical operation

In the operation of my device, a tire casing 34 may be placed on the supporting arms 10 in an upright position as shown by the dotted lines in Figure 2. The bead hooks 22 are manipulated for coacting with one bead of the tire casing 34 and the operating crank 32, and bead hooks 28 are manipulated for engaging the hooks of the members 28 with the other bead of the tire casing 34.

The operating handle is then moved outwardly away from the wall 36 and downwardly for spreading the tire casing as shown in full lines in Figures 2 and 3.

When the beads assume the full line position, the crank pin 26 will have passed over center relative to the spreading shaft 20 and hooks on the bead hooks 28 whereupon the beads hooks 28 which are slightly curved for this purpose, will engage the spreading shaft 20, and the tendency of the tire casing 34 to return to its normal position will place the parts of the tire spreader under tension so that the tire casing will be maintained in a spread position.

The lower portion of the tire casing which is then spread may be inspected or repaired if desired, after which it may be released by a reverse movement of the operating crank 32.

The arms 10 are preferably beveled or rounded at 10a to allow easy rotation of the tire casing from one position to another. A lug 32a is provided to act as a stop for the handle crank 32 when swung to the dotted line position shown in Figure 2.

If desired, the bead hooks 22 and 28 may be single instead of double and a lever may be substituted for the crank 32. Other changes may be made in the construction and arrangement of the parts of my device without departing from the real spirit and purpose of my invention, and it is my intention to cover by my claims, any modified forms of structure or use of mechanical equivalents, which may be reasonably included within their scope.

I claim as my inventon:—

1. In a tire casing spreader, a pair of supporting arms adapted for a tire casing to rest transversely thereon, a shaft between said arms, a pair of bead hooks thereon and pivoted relative to said supporting arms, a spreading shaft journaled on said arms, a crank pin carried thereby and a second pair of bead hooks pivoted to said crank pin, said bead hooks being adapted to engage the beads of said tire casing and spread the same upon rotation of said spreading shaft, said supporting arms having base members at right angles to the arms and adapted for attachment to a vertical supporting surface whereby the arms extend horizontally therefrom.

2. In a tire casing spreader, a pair of supporting arms adapted for a tire casing to rest transversely thereon, base members on said arms for attachment to a supporting surface, a shaft between said arms, a bead hook thereon and pivoted relative to said supporting arms, a spreading shaft journaled on said arms, a crank pin carried thereby and a second bead hook pivoted to said crank pin, said bead hooks being adapted to engage the beads of said tire casing and spread the same upon rotation of said spreading shaft.

3. In a tire casing spreader, a pair of supporting arms, adapted for a tire casing to rest transversely thereon, a shaft between said arms, a bead hook thereon and pivoted relative to said supporting arms, a spreading shaft journaled on said arms, a crank pin carried thereby and a second bead hook pivoted to said crank pin, said bead hooks being adapted to engage the beads of said tire casing and spread the same upon rotation of said spreading shaft, said second bead hook being curved whereby the spreading shaft may be rotated to a position where the hook of the bead hook and the crank pin are over center relative to the axis of the spreading shaft and the second bead hook then engages the spreading shaft.

4. In a tire casing spreader, a pair of supporting arms adapted for a tire casing to rest transversely thereon, a shaft between said arms, a bead hook thereon and pivoted relative to said supporting arms, a spreading shaft journaled on said arms, a crank pin carried thereby and a second bead hook pivoted to said crank pin, said bead hooks being adapted to engage the beads of said tire casing and spread the same upon rotation of said spreading shaft, said second bead hook being movable to a position where the hook thereof and the crank pin are over center relative to the axis of the spreading shaft for locking the tire casing in spread position.

Des Moines, Iowa, April 9, 1930.

BERT E. JOHNSON.